US007213804B2

(12) United States Patent
Ferroud Plattet et al.

(10) Patent No.: US 7,213,804 B2
(45) Date of Patent: May 8, 2007

(54) CHUCKING DEVICE OF A PART OF CONSTRUCTION TO BE MACHINED

(75) Inventors: Fernand Ferroud Plattet, Saint Julien en Genevois (FR); André Bouchet, Veyrier du Lac (FR)

(73) Assignee: Robotic SA, Pringy (FR)

( * ) Notice: Subject to any disclaimer, the term of this patent is extended or adjusted under 35 U.S.C. 154(b) by 0 days.

(21) Appl. No.: 11/158,487

(22) Filed: Jun. 22, 2005

(65) Prior Publication Data

US 2006/0113720 A1 Jun. 1, 2006

(30) Foreign Application Priority Data

Jun. 22, 2004 (FR) .................................. 04 07192
Dec. 30, 2004 (FR) .................................. 04 14107

(51) Int. Cl.
*B23Q 3/08* (2006.01)

(52) U.S. Cl. ........................................ 269/32; 269/228

(58) Field of Classification Search .................. 269/32, 269/24, 27, 228, 20
See application file for complete search history.

(56) References Cited

U.S. PATENT DOCUMENTS 5,823,519 A 10/1998 Tunkers ....................... 269/29
6,422,549 B2 * 7/2002 Crorey ........................ 269/32
6,557,841 B2 * 5/2003 Dellach et al. ............... 269/32
6,565,074 B1 * 5/2003 Wheeler ...................... 269/32
6,616,133 B1 9/2003 Wheeler et al. .............. 269/32
6,648,317 B2 * 11/2003 Takahashi et al. ............ 269/32
2002/0063371 A1 5/2002 Takahashi et al. ............ 269/32
2002/0195761 A1 * 12/2002 Dellach et al. ............... 269/32

FOREIGN PATENT DOCUMENTS

EP 1 179 394 A2 2/2002
EP 1 179 394 A3 2/2002

* cited by examiner

*Primary Examiner*—Lee D. Wilson
(74) *Attorney, Agent, or Firm*—Fay, Sharpe, LLP

(57) ABSTRACT

The device is a clamp (1), designed to hold a construction piece, including a clamping lever (2), which climbs by pivoting around a transverse axis (3), in a case (4) formed by two half-shells (4*a*, 4*b*) with mirror symmetry along their joining plane and containing the clamping mechanism of the device (1), which is operated, by an intermediary shaft of a fluid cylinder (6) and (7) and of a system of a connecting rod (8) and a crank (9), or directly, between two positions, the first activates the release of the piece and the second activates the clamping of the piece, characterized in that each of the two half-shells (4*a*, 4*b*) forming the case (4) are made of a material that includes at least one reinforcement insert (10) made of a distinctively more rigid material and inserted into each half-shell (4*a*, 4*b*) in a zone subjected to high stress during clamping, so as to confer a resistance to stress in that zone, augmented in torsion, traction, or compression.

8 Claims, 6 Drawing Sheets

CHUCKING DEVICE OF A PART OF CONSTRUCTION TO BE MACHINED

BACKGROUND

The present invention concerns a chucking device which includes a lever operated hydraulically or pneumatically by a piston for chucking pieces to machine or to weld.

In the industrial domain, and particularly in the automobile industry, it is necessary to hold the pieces, for example, in order to machine them or to attach them by welding. One has recourse, of course, has different devices, like for example a joining plane or a system of levers, maneuvered manually, which presents a certain number of inconveniences. Also, having perfected the system of automatic clamping that includes, at least, a lever that changes to an inactive position of release from an active position of clamping, and inversely by the movement of a piston controlled either pneumatically or hydraulically.

One knows many clamping devices that include a fluid cylinder controlling the movement of the lever arm directly or by an intermediary system of a connecting rod and crank. These clamping devices operate between two positions, the first one, the inactive position, releases the piece; the second, the active position, clamps onto the piece.

These devices, in a known way, are contained in a case formed by two half-shells of mirror symmetry along their joining plane.

This type of case is subjected to great mechanical pressures, notably at the time of clamping, thus, the two half-shells are made of a material resistant to deformation, torsion, traction, or compression.

That is why the chosen materials are often aluminum or steel.

The inconvenience in using these materials lies in the fact that they are expensive and heavy.

Furthermore, such a case will have to be painted or treated, in order to withstand the external pressure that occurs, for instance, during the discharge while welding a piece.

According to the first phase of the invention, the case has to effectively offer resistance to the mechanical constraints, but this does not concern the whole case, only certain unique zones.

SUMMARY

This is why the invention, as such, concerns a clamping device designed to hold a construction piece, includes a clamping lever, mounted pivotally around a transverse axis of the case, formed by two half-shells of mirror symmetry along the joining plane and containing the clamping mechanism of the device which is operated by an intermediary stem of a fluid cylinder and a system of a connecting rod and crank or directly; alternating between two positions, the inactive first position releases the piece, the active second position clamps. Each of the two half-shells forming the case is made of a material which includes at least one reinforcement insert made of a distinctively more rigid material and placed in each half-shell in the zone often subjected to high stress during clamping, conferring a complete resistance to stress in that zone, augmented in torsion, traction, or compression, characterized in that each of the two half-shells 4*a*, 4*b* are made of a plastic material and directly molded around the reinforcement insert 10.

Customers thus acquire a product at lesser expense which perfectly answers the problems of the previous devices. The mechanical function of the device, thus perfectly dissociated from the function of the case.

They also avoid having a complicated system of attaching the half-shells such as those in the previous style.

The present invention also concerns the characteristics which will be shown in the descriptions which follow, which are to be considered alone and according to all their possible technical combinations.

BRIEF DESCRIPTION OF THE DRAWINGS

The description is given by way of non-restrictive example, which allows for better understanding of how the invention can be made, in reference to the attached drawings, of which.

DETAILED DESCRIPTION

Figure 1:
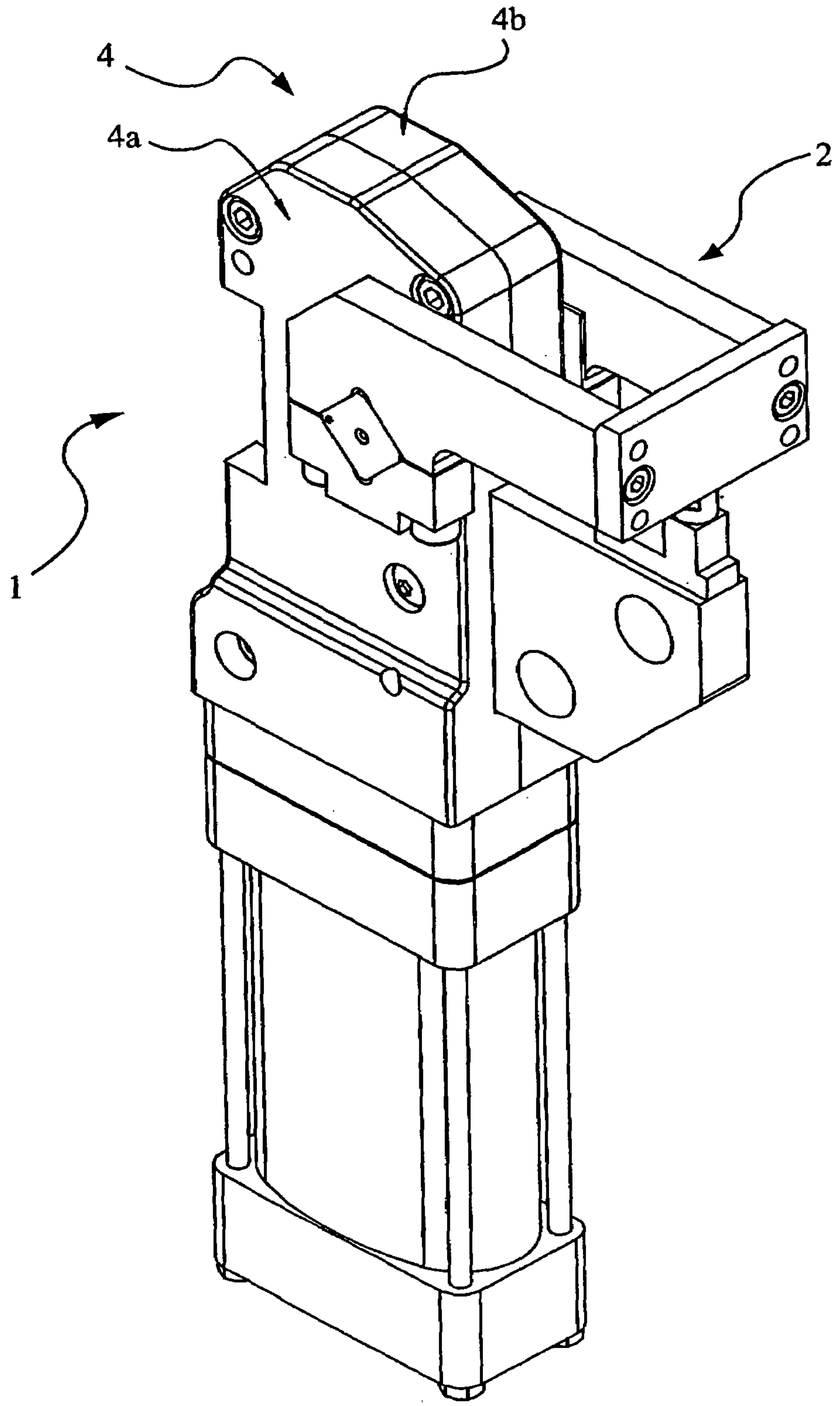
FIG. 1 is a perspective view of the clamping device according to the invention.
Figure 2:
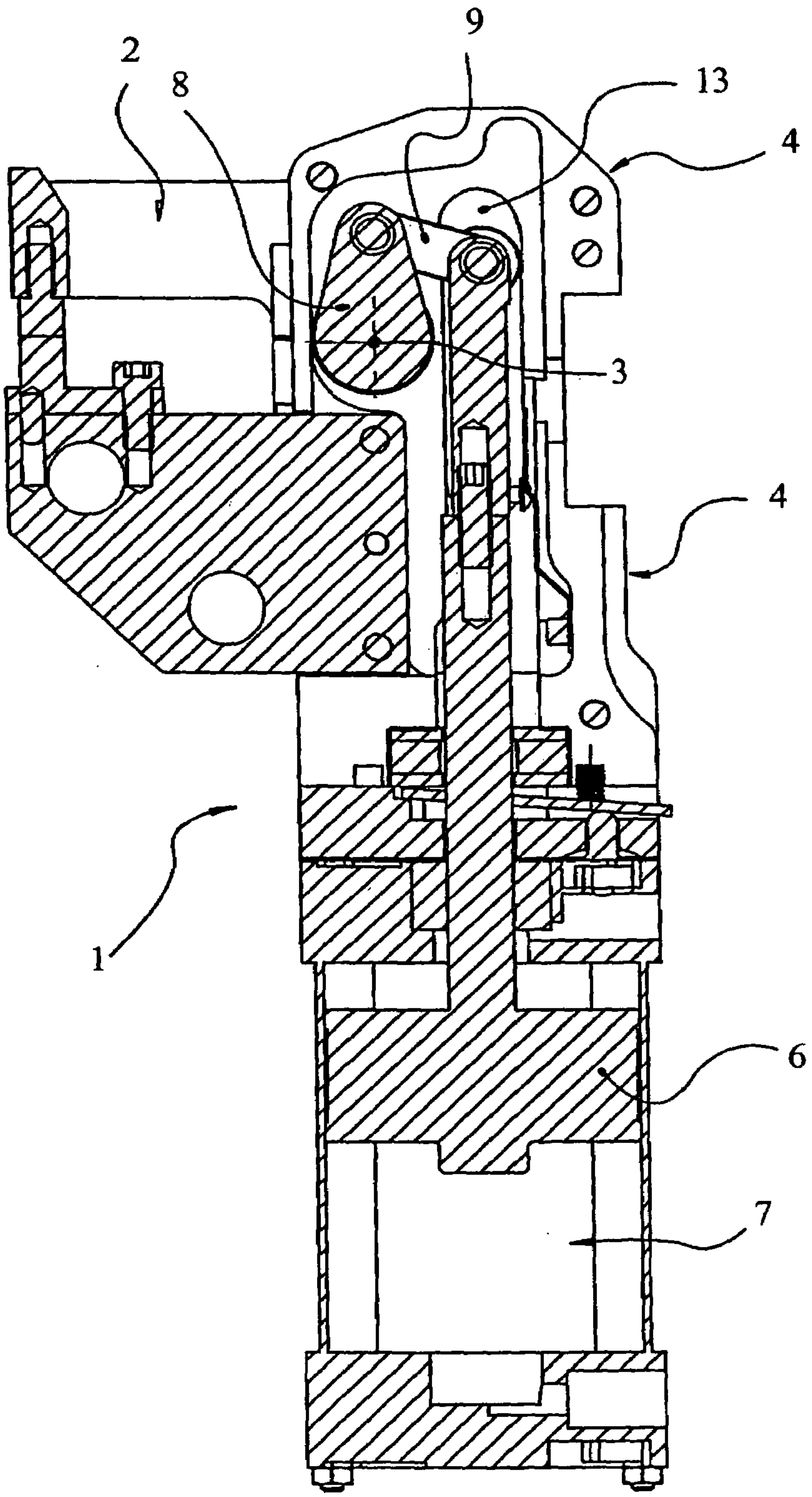
FIG. 2 is a longitudinal cross-sectional view of the device in FIG. 1.
Figure 3:
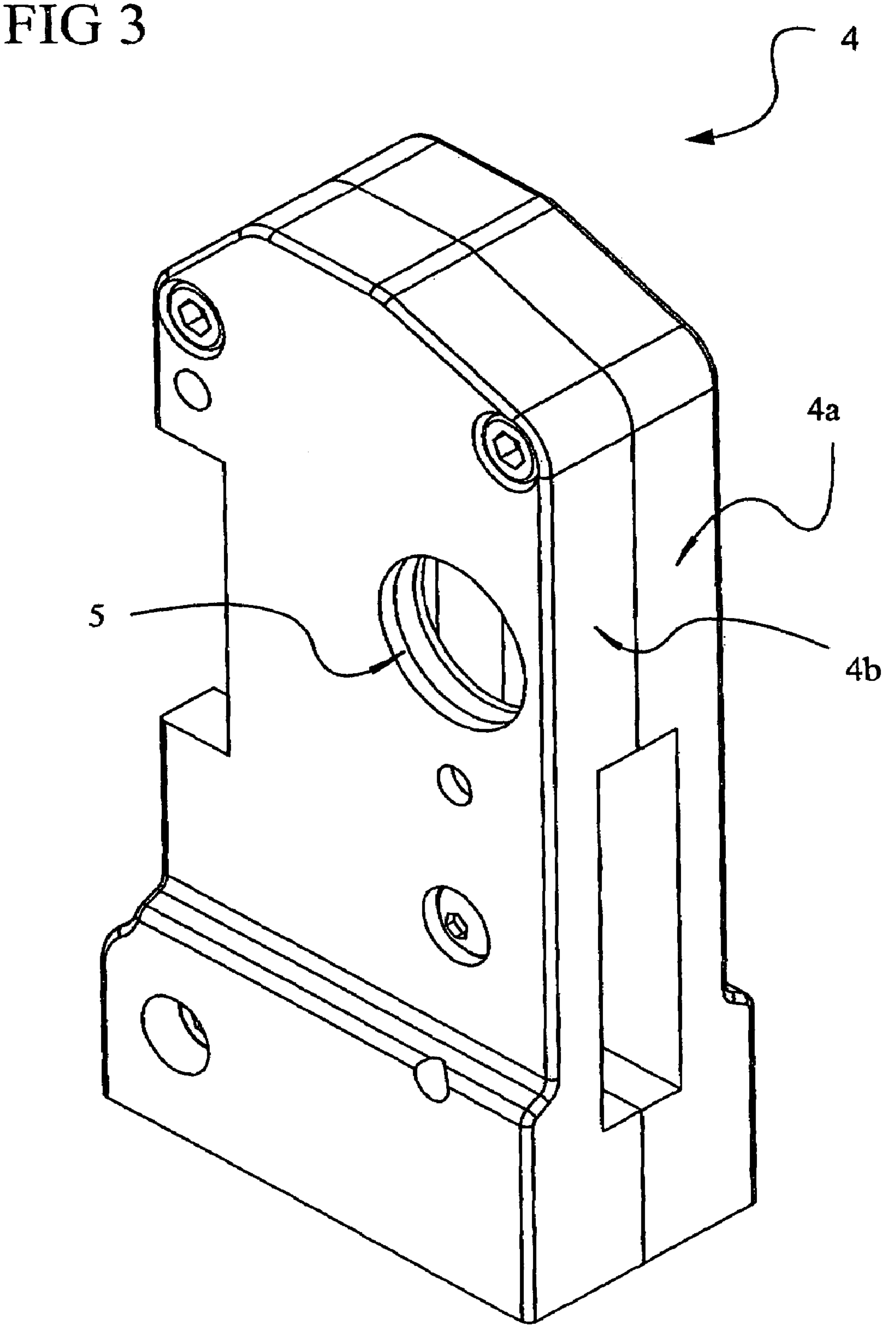
FIG. 3 is a perspective view of a single case which is designed to contain the device.
Figure 4:
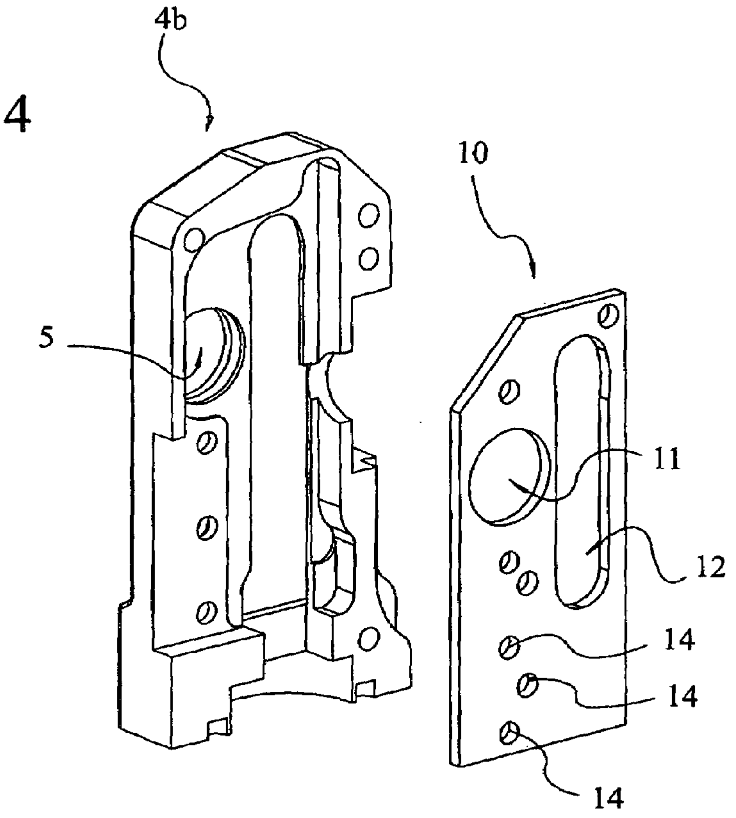
FIGS. 4 and 5 respectively, represent, in a split view, the two half-shells constituting the case and their respective insert.
Figure 5:
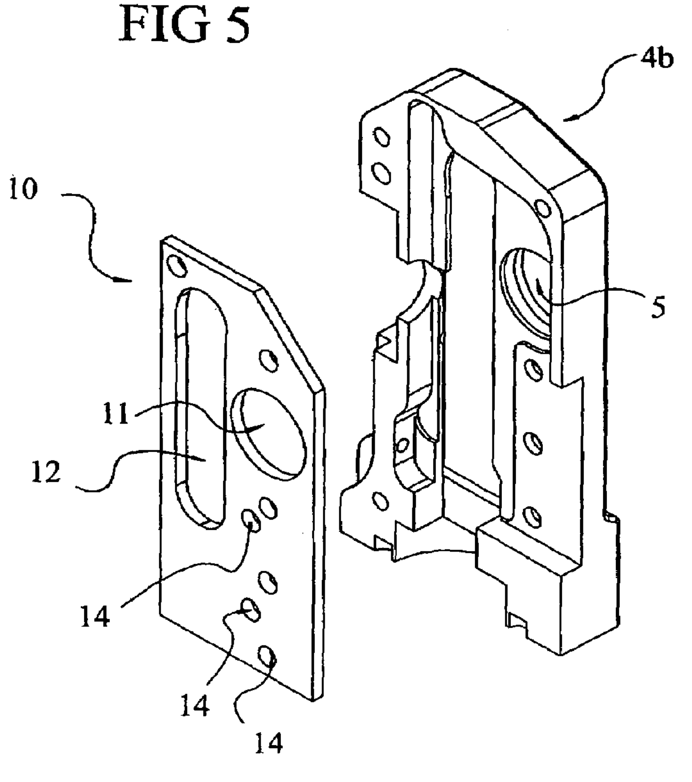
Figure 6:
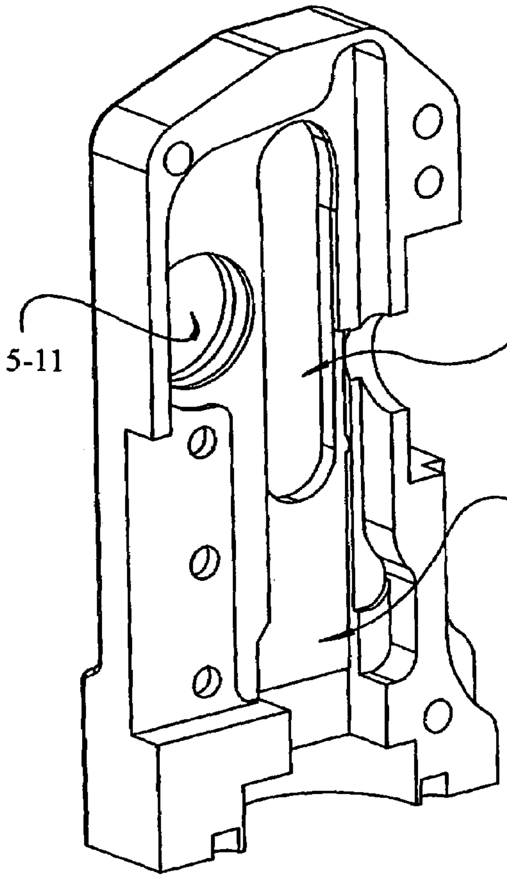
FIGS. 6 and 7 respectively, represent the two half-shells constituting the case according to FIGS. 4 and 5, in perspective, after the insertion of the inserts.
Figure 7:
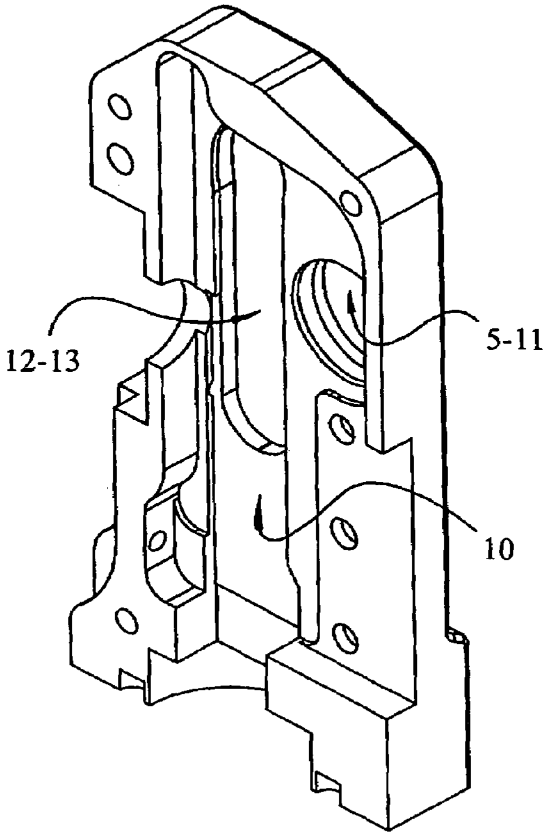
Figure 8:
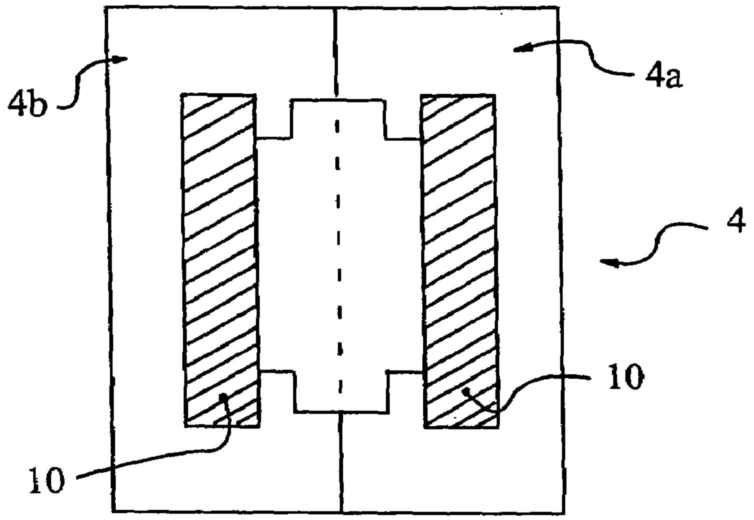
FIG. 8 is a schematic view of a horizontal cross-section of the case in the invention; and, FIG. 9 is a schematic view of a vertical cross-section of the case in the invention.
Figure 9:
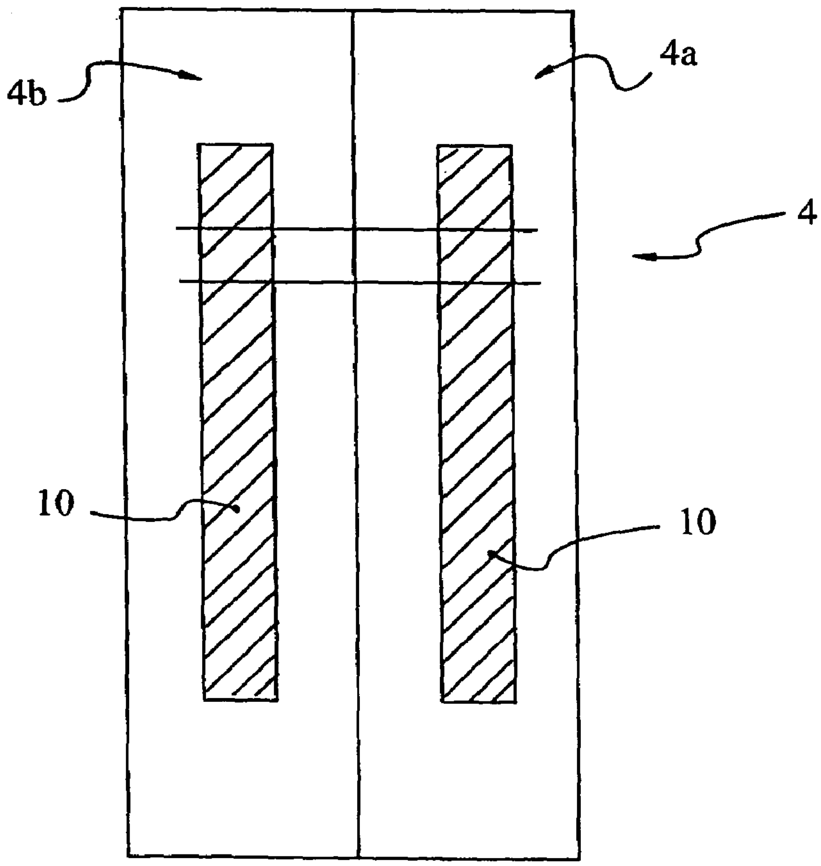

The holding device 1 according to the invention includes a clamping lever 2 which climbs by pivoting around a transverse axis 3 on the case 4 formed by two half-shells 4*a*, 4*b* with noticeable symmetry along the joining plane which contains the device.

The lever 2 can move between two positions, the first position is the inactive position which releases the piece to be welded or machined, the second position is the active position which holds the piece.

The retaining lever 2 is operated by the movement of a piston 6 moving in a chamber in the lower part of the case 4, and an intermediary system of a connecting rod 8 and a crank 9.

Let us note that the upper part of the aforementioned case 4 has the general form of a shell that is formed by the two half-shells 4*a*, 4*b*, creating between them a slot designed for the passage of the lever 2, and that the two aforementioned half-shells 4*a*, 4*b* are, moreover, pierced by a transversal hole 5, in which the pivoting axis 3 of the lever 2 is engaged.

According to the invention, each of the two half-shells 4*a*, 4*b* forming the case 4 is made by casting a plastic material which includes at least one reinforcement insert 10 made of a distinctively more rigid material and placed in each half-shell 4*a*, 4*b* in the zone subjected to high stress during clamping, so as to confer a complete resistance to the stress in the zone augmented in torsion, traction, or compression.

In that way, it weighs less in comparison to traditional cases made with metal, without subsequently weakening the resistance.

Furthermore, there is a choice in the process of casting the case, which can be made by casting or injecting and the material constituting the insert which can be made of anything.

The insert(s) 10 placed into the half-shells 4*a*, 4*b* forming the case 4 can be of aluminum or aluminum alloy.

According to a variation, the insert(s) 10 placed into the half-shells 4*a*, 4*b* forming the case 4 are made of steel.

According to a specific variation not shown, each half-shell 4*a*, 4*b* of the case 4 include two inserts, one of which is aluminum and the other is steel, arranged respectively, in a stress zone and in an extreme stress zone experienced during clamping, the stresses and applied during clamping being greater than the intrinsic strength of the shells 4*a*, 4*b* which is made of a plastic material and forms the case 4.

According to the present production method, each half-shell 4*a*, 4*b* of the case 4 includes an identical method and a symmetrical insert 10 constituted by a plate obtained by a slice in a metallic block, in which holes are made, of which the circular hole 11 corresponds to an opening 5 in one of the half-shells 4*a*, 4*b* designed for the passage of the transverse axis of the lever 2, and whose other oblong hole 12 corresponds to an opening 13 in the same half-shell 4*a*, 4*b* designed for the clearance of the head of the piston 6.

Also note that the inserts 10 of each half-shell 4*a*, 4*b* include perforations 14 constituting the many points through which the plastic material of the aforementioned half-shells 4*a*, 4*b* extends during the casting operation.

Advantageously, the constituent plastic matter of the half-shells 4*a*, 4*b* forming the case 4 is polyurethane.

Of course, it could also be aluminum or another material, which has, in conforming to the invention, a lesser resistance in comparison to two half-shells 4*a*, 4*b*.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. A clamping device designed to hold a construction piece including a clamping lever, which climbs by pivoting around a transverse axis on a case, formed by two half-shells symmetric alone their joining plane and containing the clamping mechanism of the device, to be operated, by the intermediary of a fluid cylinder and a system of a connecting rod and crank or directly, alternately between two positions: a first inactive position which releases the piece, and a second active position, which clamps onto the piece, in which each of the two half-shells which form the case includes at least one reinforcement insert made of a distinctly more rigid material and placed in each half-shell in a zone subjected to high stress during clamping, so as to confer a resistance to the stress in said zone, augmented in torsion, in traction or in compression, wherein each half shell of the case (a) is made of a plastic material directly molded around the reinforcement insert and.

(b) includes a symmetrical insert made from a plate cut from a metallic block, in which holes are made of which a circular hole corresponds to an opening in one of the half-shells for the passage of the transverse axis of the lever, and an other oblong hole corresponds to an opening in the same half-shell for clearance of the head of a piston.

2. The device according to claim 1, wherein the inserts integrated in the half-shells forming the case axe aluminum or an aluminum alloy.

3. The device according to claim 2 wherein each half shell of the case includes two inserts, of which one is aluminum and the other is steel, placed respectively, in a stress zone and in an extreme stress zone during clamping, the stress being greater than the intrinsic strength of the shells made of a plastic material and forming the case.

4. The device according to claim 1 wherein the inserts integrated in the half-shells forming the case are steel.

5. The device according to claim 1, wherein the inserts of each half-shell include perforations that define many points that receive and are anchored to the plastic material of the aforementioned half-shells during a casting operation.

6. The device according to claim 1 wherein the plastic material forming the half shells forming the case is polyurethane.

7. A plastic clamping device comprising:

a plastic case;

metal reinforcing plates in the plastic case, the metal plates each defining an aperture;

an axle rotatably received in the aperture;

a lever connected to the axle for rotation between a clamping position and a release position;

a fluid cylinder mounted in the plastic case which rotates the axle to move the lever between the clamping and release positions.

8. The plastic clamping device according to claim 7, wherein the plastic case is formed by injecting or molding and the metal reinforcing plates include perforations through which the plastic extends during the injecting or molding such that the molded plastic case and the metal reinforcing plates form a unitary structure.

* * * * *